US005520422A

United States Patent [19]

Friedrich et al.

[11] Patent Number: 5,520,422
[45] Date of Patent: May 28, 1996

[54] HIGH-PRESSURE FIBER REINFORCED COMPOSITE PIPE JOINT

[75] Inventors: Ralph Friedrich, Hermosa Beach; Ming Kuo, Cerritos; Kevin Smyth, Whittier, all of Calif.

[73] Assignee: Ameron, Inc., Pasadena, Calif.

[21] Appl. No.: 327,616

[22] Filed: Oct. 24, 1994

[51] Int. Cl.⁶ ................................... F16L 13/00
[52] U.S. Cl. .................. 285/318; 285/330; 285/915; 285/297; 285/423
[58] Field of Search .................... 285/318, 330, 285/915, 294, 297, 423, 333; 411/438; 403/229

[56] References Cited

U.S. PATENT DOCUMENTS

| | | |
|---|---|---|
| 10,877 | 10/1887 | Wilbur . |
| 170,473 | 11/1875 | Flagler et al. . |
| 506,484 | 10/1893 | Ewing . |
| 2,341,670 | 2/1944 | Stinson ........................... 411/438 |
| 2,418,418 | 4/1947 | Martin et al. ................... 170/173 |
| 3,062,568 | 11/1962 | Andresen et al. .............. 285/333 |
| 3,353,563 | 1/1967 | Hutton ............................ 138/39 |
| 3,396,994 | 8/1968 | Ito et al. ......................... 285/248 |
| 3,427,047 | 2/1969 | Mayo .............................. 285/3 |
| 3,606,401 | 9/1971 | Schwarz ......................... 285/297 |
| 4,153,656 | 5/1979 | Bunyan ........................... 264/40.1 |
| 4,174,124 | 11/1979 | Dockree ......................... 285/54 |
| 4,351,364 | 9/1982 | Cocks ............................. 138/133 |
| 4,491,351 | 1/1985 | Galle, Jr. et al. ............. 285/318 |
| 4,647,080 | 3/1987 | Sandt et al. ................... 285/297 |
| 4,657,049 | 4/1987 | Fourty et al. .................. 138/133 |
| 4,893,658 | 1/1990 | Kimura et al. ................. 285/333 |
| 4,943,094 | 7/1990 | Simmons ........................ 285/423 |
| 5,106,130 | 4/1992 | Ellsworth ....................... 285/423 |
| 5,213,379 | 5/1993 | Taniguchi et al. ............. 285/423 |
| 5,233,737 | 8/1993 | Policelli ......................... 285/423 |
| 5,350,202 | 9/1994 | Fritz et al. ..................... 285/423 |
| 5,398,975 | 3/1995 | Simmons ........................ 285/333 |

*Primary Examiner*—Eric K. Nicholson
*Attorney, Agent, or Firm*—Christie, Parker & Hale

[57] ABSTRACT

A pipe joint for fiber reinforced composite pipe has internal and external matching tapers with a low taper angle. A half round helical groove is formed in each of the internal and external tapers for receiving several turns of a ductile key. Deformation of the key in shear redistributes longitudinal loads along the length of the pipe joint. The outer member of the pipe joint has a high stiffness so that internal pressure in the pipe presses the tapered surfaces together so that the resulting friction enhances the longitudinal load carrying capability of the joint. High external stiffness may be provided by winding the external moiety of the joint with high modulus of elasticity fiber. The pipe joint is sealed by introducing a liquid ductile thermosetting sealant between O-rings at the inner end of the joint. The seal can be nondestructively tested and deployed under water before the sealant cures. The pipe joint is usable on high strength lightweight fiber reinforced composite pipe having helically wound steel strips embedded in the fiber reinforced resin. The pipe joint on such pipe is on an enlarged portion of glass fiber reinforced composite built up on an end of the pipe. The steel strips are terminated at differing distances from the end of the pipe joint and the ends of all of the steel strips are completely embedded in the fiber reinforced resin.

42 Claims, 4 Drawing Sheets

HIGH-PRESSURE FIBER REINFORCED COMPOSITE PIPE JOINT

BACKGROUND

This invention concerns a joint between adjacent pieces of fiber reinforced composite pipe which is suitable for use with conventional fiberglass pipe, high strength carbon fiber composite pipe or with high strength fiber reinforced pipe containing embedded steel strips.

Fiber reinforced composite pipe finds appreciable utility where corrosive materials are carried in a pipeline or where the pipeline is buried or laid on the sea floor or is otherwise subjected to an external corrosive environment. Techniques have been developed for producing fiber reinforced pipe for carrying high internal pressures. For example, until recently a typical high pressure pipe might have a 10 cm nominal diameter and an internal burst pressure of about 600 bar. More recently, fiber reinforced high pressure pipes with a 20 cm nominal diameter have been rated at about 1200 bar burst pressure.

Such fiber reinforced composite pipe, when reinforced with glass fibers, may have a wall thickness on the order of 5 cm, which clearly makes it costly and heavy. There is currently development of another variety of high pressure pipe which includes helically wound steel strips embedded in fiber reinforced resin. Such an embodiment has such good strength that the wall thickness may be as little as 7 mm for a 25 cm nominal diameter piper. Such a pipe is described and illustrated in U.S. Pat. No. 4,351,364, for example.

A substantial concern in such high strength pipe, either fiber wound or with steel reinforcement, is the coupling or joint between adjacent pipes. The pipe joint needs to have a circumferential burst strength at least as great as, and preferably more than, the principal length of pipe. More significantly, the joint must have sufficient longitudinal shear strength to prevent the pipes from separating under internal pressure or other axial loads. Preferably the joints are designed to have sufficient longitudinal shear strength that they will not fail before rupture of the pipe itself.

Design of a suitable joint for fiber reinforced composite pipe differs appreciably from metal since the fiber reinforced composite pipe, as contrasted with steel, for example, has very little ductility. This places significant limitations on what can be done in pipe joints. In a conventional bell and spigot joint secured by filling the joint with adhesive, the high stiffness of the adherent places a high shear stress on adhesive in the joint. The distribution of stress along the joint is not uniform. The shear stress is quite high at the ends of the adhesive, as much as three times the average stress, and decreases rapidly from the ends toward the middle. In a long adhesive joint, the shear stress in the middle of the joint may be near zero.

The high stress at the ends of adhesive in such a lap shear joint can result in failure of the adhesive in shear adjacent to an end of the joint. This simply transfers the shear stress further along the joint and there is progressive failure at average stresses that would appear to be well within the capability of the adhesive.

Other joints for fiber reinforced pipe are also difficult because of the stiffness of the fiber reinforced composite. It is desirable to provide a pipe joint that redistributes stress along the length of the joint to avoid such progressive failure of the joint. Preferably the joint has a higher strength than the wall of the pipe remote from the joint. The pipe joint should have a high safety margin, i.e. a failure stress greater than the rated capability of the joint. The joint should be easily and economically assembled in field conditions.

BRIEF SUMMARY OF THE INVENTION

There is therefore provided in practice of this invention according to the presently preferred embodiment, a pipe joint having an external taper on one end of a fiber reinforced composite pipe and a matching internal taper in a coupling or the like. For example, the tapers have an included half angle in the range of from one to five degrees. A half groove extends helically along the length of each of the internal and external tapers. A ductile key member extends helically along both grooves for locking the internal and external tapers together.

Preferably the joint is sealed by having a pair of surfaces facing each other adjacent an end of the key member with an elastic sealant between and adhered to both facing surfaces. An elastomeric seal ring adjacent each longitudinal end of the sealant retains the sealant when it is injected as a liquid and before it cures.

Preferably the hoop stiffness of the external coupling adjacent to the internal taper is greater than the hoop stiffness of the pipe adjacent to the external taper so that a substantial fraction of the longitudinal shear strength of the joint is obtained by friction between the tapers. The higher hoop stiffness may be obtained by forming the external portion of the pipe joint with a fiber reinforcement that has a larger modulus of elasticity than the modulus of elasticity of material used in the inner pipe.

Such a pipe joint is particularly useful in a fiber reinforced composite pipe including helically wound steel strips embedded in the resin. In such a joint, the steel strips end within the pipe joint and at different distances from the end of the pipe joint.

DRAWINGS

These and other features and advantages of the present invention will be appreciated as the same becomes better understood by reference to the following detailed description when considered in connection with the accomanying drawings wherein.

DESCRIPTION

Figure 1:
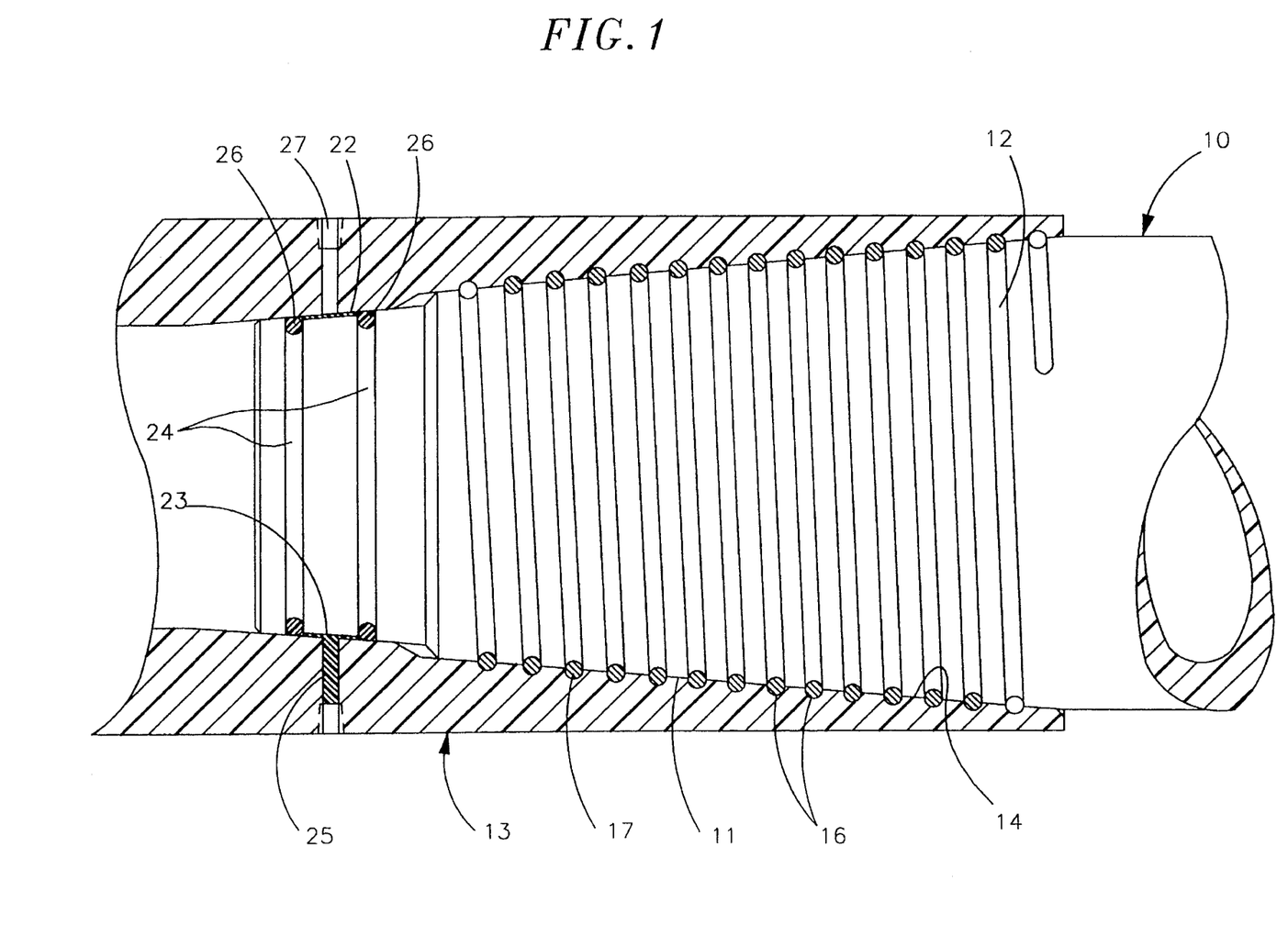
FIG. 1 is an exemplary fiber reinforced composite pipe joint with the outer coupling being in longitudinal cross section.

A typical pipe joint has an inner member of fiber reinforced composite pipe 10 such as is conventionally made of epoxy resin reinforced with helically wound glass fibers. These are conventional pipes, albeit with a thick wall for withstanding high internal pressures. A high pressure pipe having a nominal inside diameter of about 20 cm may have a wall thickness of about 5 cm. The pipe has an external taper 11 adjacent its end. A half-round groove 12 extends helically along the length of the external taper. (It will be recognized that the "helical" groove in the tapered surface is not a cylindrical helix but instead has the same taper as the tapered surface 11 and a uniform depth throughout the length of the groove.)

The external taper on the pipe fits into a coupling 13 having an internal taper 14 matching the external taper on the pipe. The internal taper also has a half-round groove 16 with the same pitch as the groove on the pipe. In this description, the outer member of the pipe joint combination is referred to as a "coupling" since that is a usual embodiment for a pipe joint. Alternatively, one may make a pipe with an external taper on one end and an internal taper on the other end and for purposes of this description, the end with an internal taper would be referred to as a "coupling". The "coupling" may be in any of a broad variety of pipe fittings such as valves, flange transition fittings, unions, etc. In one type of pipe for which this invention is useful, there are external tapers at both ends of each length of pipe and adjacent pieces of pipe are interconnected by a short coupling having two internal tapers.

The internal and external tapers are interconnected by a round ductile key member 17, half of which lies in each of the half-round grooves on the internal and external tapers respectively. A suitable material for a key comprises nylon or similar ductile, relatively strong plastic. A preferred key for many applications is formed of high purity aluminum, which has relatively high strength, is quite ductile and is corrosion resistant. Aluminum has about twice the shear strength of nylon. Aluminum is desirable for applications where the pipe may be immersed in water. Nylon tends to swell during exposure to water.

Figure 5:
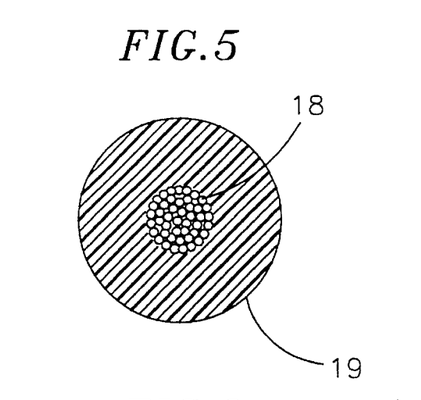
FIG. 5 is a transverse cross section of an embodiment of key member for a pipe joint.

Another suitable key, as illustrated in FIG. 5, may be formed by embedding a flexible steel core 18 in a layer of ductile plastic sheath 19 such as nylon. The steel core may be a single wire or is preferably a cable twisted from multiple strands of wire for greater flexibility. In such an embodiment, the outer plastic provides the ductility important in the key and the steel provides shear strength. It is believed to be important to closely embed the metal core in the plastic sheath without bubbles or voids.

Figure 6:
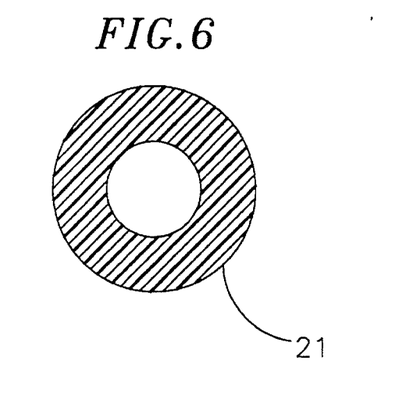
FIG. 6 is a transverse cross section of another embodiment of key member.

Another embodiment of key, as illustrated in FIG. 6, may be a hollow tube of metal stronger than high purity aluminum, such as stainless steel. Shear strength is provided by the metal and ductility is provided by denting of the tube wall 21. The desired ductility and shear strength of such a key is obtained by selection of the material and the wall thickness of the tube.

It is preferred that the shear strength of the key be up to one half of the shear strength of the fiber reinforced pipe joint moiety so that deformation certainly occurs in the key and loads that could cause the fiber reinforced composite to fail are avoided.

A round key is preferred so that the grooves in the pipe joint are rounded. This minimizes stress concentrations in the essentially non-ductile fiber reinforced composite. Furthermore, a round key can be wound smoothly in a helical groove extending along a tapered surface. A key with a non-round cross section twists when wound in a tapered helix and would need to be deformed to lie smoothly in a groove.

Some dimensions of such a pipe joint may be given to provide an idea of scale. For a pipe with a nominal inside diameter of about 20 cm, the total length of the pipe joint is about 48 cm. The pitch of the grooves in the tapered surfaces is about 2.6 cm. The groove is made long enough to accommodate 13 full turns of a key around the taper. The key has a diameter of about 7.5 mm.

An important dimension of the pipe joint is the angle of the taper in the joint. The included half angle of the taper is in the range of from one to five degrees from the axis of the taper. As explained hereinafter, the friction in the joint provides a significant fraction of the total shear strength of the joint. If the included half angle is more than about five degrees, the joint may become too short to accommodate enough turns of the key and to provide enough friction contribution. If the included half angle is less than about one degree, a joint may become unreasonably long and there is difficulty in maintaining appropriate diametral tolerances on the internal and external tapers. A relatively small diametral tolerance is required for minimizing axial length discrepancies in an assembled joint.

The internal taper and groove are formed in the course of winding a coupling on a mandrel and there is good control of dimensions. The external taper and groove are machined and a diametral tolerance between the two parts within less than ±250 µm can readily be maintained. The taper is more forgiving than a cylindrical surface to discrepancies in diameter. A close fit between matching tapers can be obtained by axial shifting, whereas a cylindrical joint must be made with closer tolerances to get as tight a fit.

It is preferred that the included half angle of the taper be in the range of from two to four degrees. A four degree taper angle is found to be quite suitable for glass fiber reinforced composite pipe using a nylon key. A typical joint length might be from about one to 1½ times the diameter of the pipe. A high strength fiber reinforced pipe may have a sufficient wall thickness that a taper angle as high as four or five degrees is needed to extend a suitable distance through the thickness of the pipe wall.

Although a four degree half angle is suitable for an all fiber reinforced pipe, a fiber reinforced pipe with embedded steel strips (described in greater detail hereinafter) may advantageously employ a lower taper angle of as little as two degrees. Such steel reinforced pipe may employ a thinner pipe wall than a pipe made solely with fiberglass and a low taper angle may be sufficient. It might be noted that a higher taper angle is often preferred to make it easier to remove internal tooling used for winding fittings such as elbows with an internal taper on each end. The diametral tolerances required for manufacturing the pipe joint are also relaxed for larger taper angles.

The pipe joint is assembled by first winding the ductile key into the half-round groove in the internal taper. A straight nylon key springs outwardly within the taper as it is put in place and readily fits into the groove. An aluminum key may be wound onto a tapered mandrel to have a diameter somewhat larger than the internal taper. When the key is threaded into the taper, the key fits into the groove.

The external taper is then inserted in the internal taper and one or the other of the members is rotated to essentially thread the joint together. The pipe and coupling are threaded together until the tapers engage tightly.

It is preferred to place the key inside the internal taper for ease of assembling and disassembling the joint. The external taper threading into the internal taper tends to force the key outwardly and permit free insertion of the pipe into the coupling. If a key firmly on the pipe were used, the joint could be self-locking and it could be difficult to fully tighten the joint. Likewise, the key in the coupling tends to be self releasing from the pipe when the joint is unthreaded.

The key in the tapered pipe joint does not provide a fluid tight seal. A seal is provided by an adhesive elastic sealant 25 between an external sealing surface 22 on the pipe and a facing internal sealing surface 23 in the coupling. In the illustrated embodiment, the sealing surfaces have the same taper at a four degree half angle as provided on the tapered surfaces forming the mechanical pipe joint.

A pair of circumferential O-ring grooves 24 straddling the sealing surface near the end of the pipe accommodate elastomeric O-rings 26 which seal against the facing sealing surface within the coupling. After the joint is assembled, a liquid sealant may be injected through one of a pair of passages 27 through the wall of the coupling. The second passage serves as an air vent and indicates when the sealant has filled the space between the sealing surfaces. The elastomeric O-rings retain the sealant within that space while it is liquid before curing. The O-rings also serve as a buffer at each end of the sealant within the annular sealing space for minimizing shear strain and keeping the sealant from shearing from the facing surfaces.

A preferred sealant comprises a two part thermosetting polysulfide resin. This is a relatively low cost, temperature and solvent resistant resin that adheres well to surfaces, even if wet. By selection of activators, etc., the pot life of the resin can be adjusted to provide adequate time for inspection and rework of the seal before it cures. Another suitable sealant is a fluorinated silicone resin. Elastomeric polyurethane resins may also be used.

Typical thickness of the sealant between the facing surfaces is about 0.75 mm. The length of the sealing surfaces between the O-rings in this embodiment is about 3.9 cm, although the taper on the two moieties of the joint is appreciably longer to assure that the passages 27 are between the O-rings when the joint is assembled.

It is preferred that the sealing surfaces are at the smaller diameter (internal) end of the pipe joint and beyond the end of the key. This places the O-ring grooves in a portion of the pipe which has very low longitudinal stress.

Figure 2:
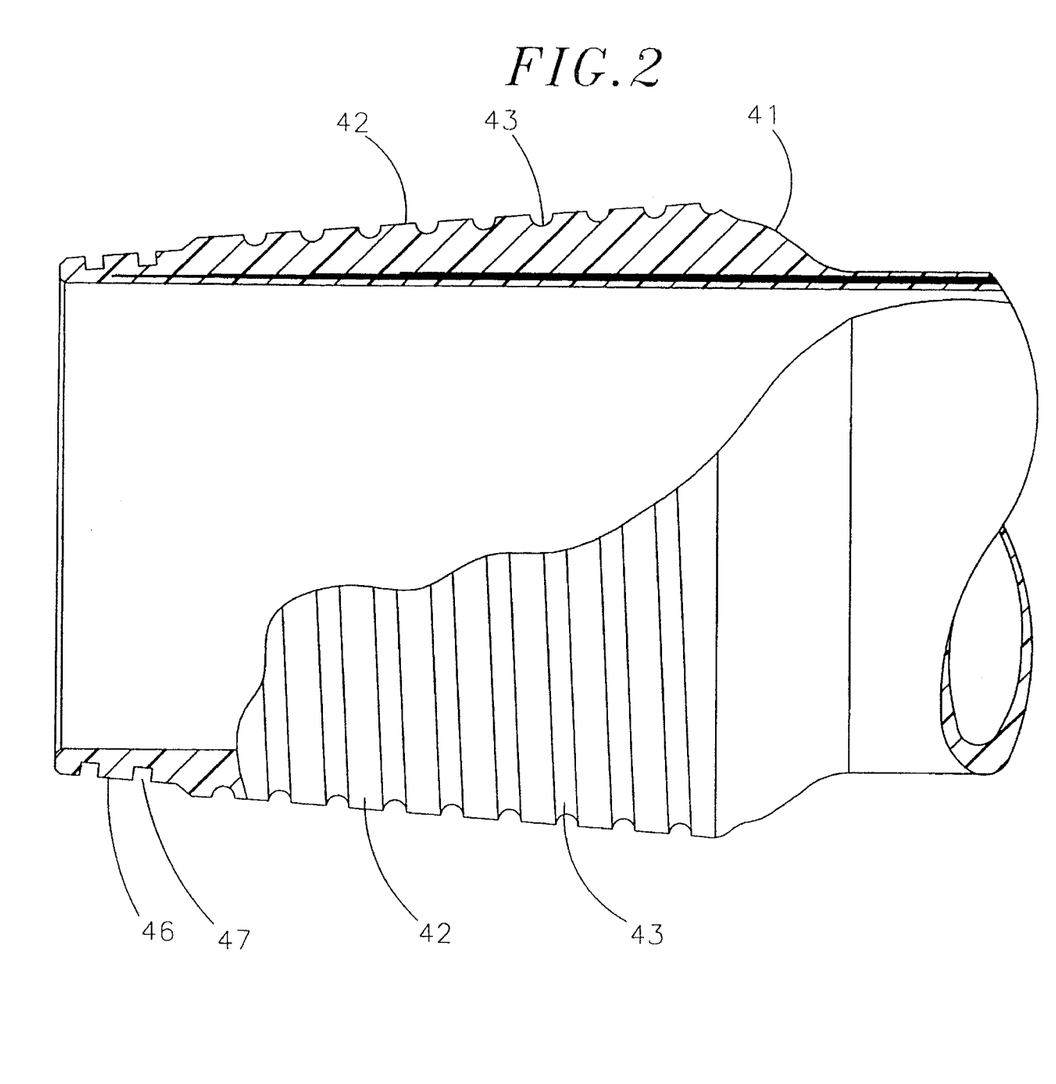
FIG. 2 is a side view of the inner member of a joint partially in longitudinal cross section for a second embodiment of fiber reinforced composite pipe with embedded steel strips.
Figure 3:
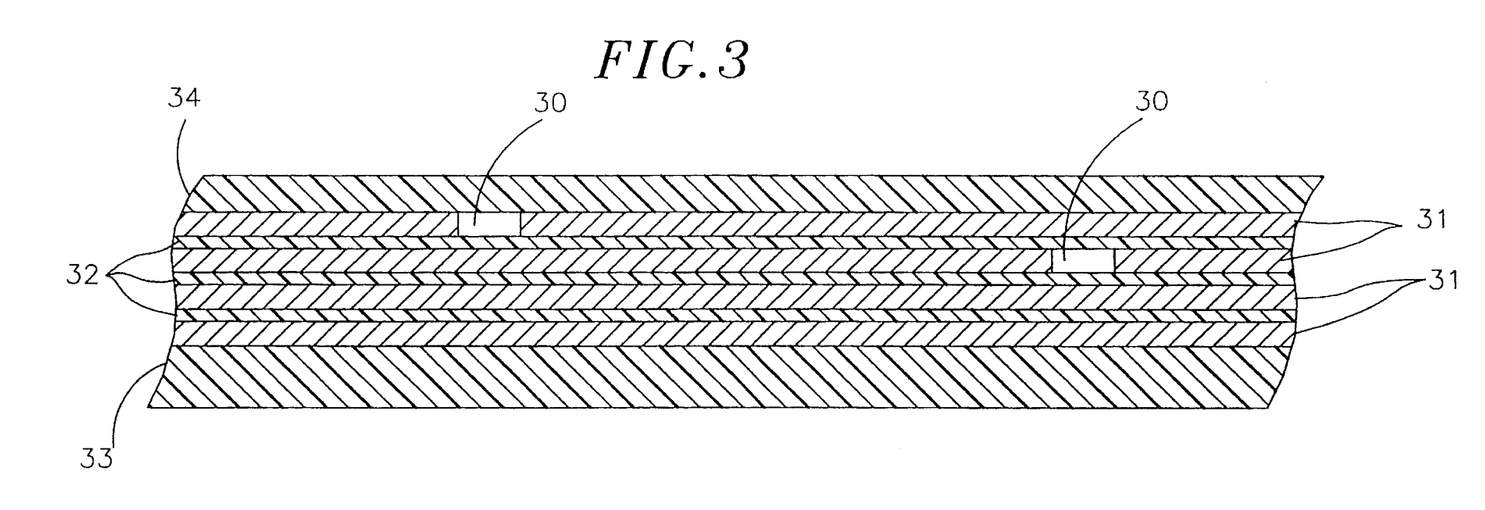
FIG. 3 is a fragmentary longitudinal cross section of the pipe of FIG. 2 at a location away from the pipe joint.
Figure 4:
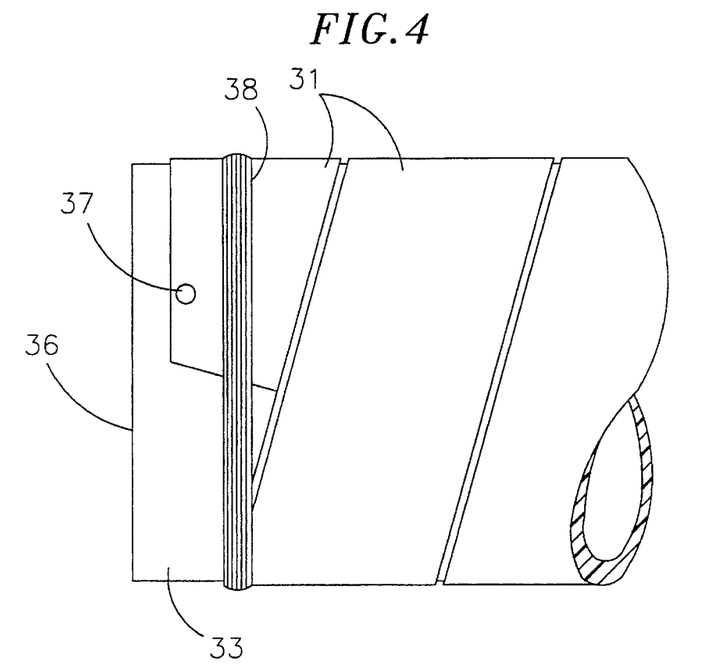
FIG. 4 is a side view of an end portion of the pipe of FIG. 2 in an intermediate stage of manufacture.

A second embodiment of pipe joint illustrated in FIGS. 2 to 4 is described before describing functioning of the pipe joint. In this embodiment, the fiber reinforced composite pipe also comprises a plurality of helically wound steel strips embedded in the wound fiber reinforcement. The end of such a pipe with a pipe joint is illustrated in FIG. 2 with a portion illustrated in longitudinal cross section. FIG. 3 is a fragmentary longitudinal cross section of the wall of the pipe significantly enlarged to show detail. FIG. 4 illustrates the end of the pipe in an intermediate stage in its manufacture. The drawing is as if some of the outer layers of the pipe were peeled away.

This moiety of the pipe joint mates with a coupling (not shown) having an internal taper generally similar to the pipe coupling illustrated in FIG. 1, except that the dimensions and geometry match the external dimensions of the pipe joint moiety illustrated in FIG. 2.

The principal portion of the length of the pipe, i.e., away from the pipe joint, includes four steel strips 31. The steel strips are too thin to illustrate in cross section in FIG. 2 but are illustrated in the fragmentary cross section of FIG. 3. In an exemplary embodiment of pipe having a nominal 25 cm diameter, there are four steel strips helically wound within the fiber reinforced composite. Each strip is from 10 to 15 cm wide and has a thickness of about 0.5 mm. The strips are helically wound with the edges in close proximity, typically 2 mm or less. Successive strips are staggered so that the gaps 30 between the edges of the strips are not aligned. A thin layer 32 of epoxy resin (about 50 µm) is between each adjacent pair of steel strips. Inwardly from the innermost steel strip, there is a layer 33 of glass fiber reinforced epoxy with a thickness of about 2.5 mm. On the outer wall of the pipe, outwardly from the steel strips, there is another layer 34 of glass fiber reinforced epoxy having a thickness of about 1.5 mm. Thus, the steel strips are completely embedded in the fiber reinforced composite.

FIG. 4 illustrates an end of the pipe with outer layers peeled away showing essentially the innermost layer 33 of fiber reinforced composite and the innermost layer of helically wound steel strip 31. The end of the steel strip is cut off at the helix angle of the strip winding so that the cut edge is parallel to the end 36 of the pipe. The otherwise sharp point on the end of the strip is likewise cut off. There is a hole 37 near the centerline of the strip near the end for receiving a tooling pin (not shown) to hold the end of the strip during winding. After the layer of steel strip is wound, a circumferential winding of glass rovings 38 is wrapped over the end portion of the strip to secure it in place while subsequent steel strips and the outer layer of fiber reinforced resin are added.

The next overlying steel strip is helically wound with the same helix angle and the same direction of winding. The end of the overlying steel strip, however, is cut off at a longer distance from the end of the pipe than the innermost layer. Each succeeding layer is similarly cut off at successively greater distances from the end of the pipe. This is illustrated by the widening black line in FIG. 2 which increases in width at successively greater distances from the end of the pipe. The scale of the drawing is too small to show the strips individually and in cross section. By staggering the ends of the successive steel strips, load is distributed to the joint at the end of the pipe over an appreciable distance instead of at a single location where stress concentrations could damage the pipe when loaded by pressure or otherwise.

It will also be noted that all of the steel strips end at a distance from the end of the pipe so that the steel strips are completely embedded in the fiber reinforced resin. The surrounding epoxy shields the steel from corrosive media that may be present inside or outside of the pipe.

In an exemplary embodiment where the steel strips are each about 10 cm wide, the end of the innermost strip is about 2.5 cm from the end of the pipe. Each successive steel strip ends about 5 cm, or half the width of the strip, away from the end of the pipe.

After the inner and outer layers of fiber reinforced resin and the embedded steel strips are wound, the pipe joint moiety is added over these layers at the end of the pipe. Additional layers of glass fiber rovings wetted with epoxy are wound over the outside of the pipe to build up sufficient thickness to machine the finished geometry of the pipe joint. Typically the fibers are wound at a helix angle of about 70° to 80° with some outer wraps being substantially circumferential. In an exemplary embodiment with a nominal 25 cm diameter pipe, the diameter of the thickest portion of the built up windings from which the joint is made is as much as 34 cm. The end 41 of the added fiber reinforced composite is gradually feathered to the smaller diameter of the principal length of the pipe either in the process of winding or by machining after winding is completed. Feathering of the end minimizes stress concentrations adjacent to the joint.

The pipe joint has an external tapered surface 42 with a half round groove 43 extending helically along its length.

The taper has an included half angle of four degrees. In an exemplary embodiment of a nominal 25 centimeter diameter pipe, the length of the taper which could engage an internal taper in a coupling is at least 25 centimeters and preferably 26 or 27 centimeters. The pitch of the groove is about 3 centimeters, yielding a sufficient length of groove to accommodate six full turns of a ductile key. A typical key diameter is about 9.5 millimeters.

As previously described in the embodiment of fiber reinforced composite pipe without the embedded steel strips, there is a sealing surface 46 near the end of the pipe beyond the end of the key groove. The sealing surface is between O-ring grooves 47 for retaining sealant as it is pumped into the space adjacent the sealing surfaces.

There are a number of features of the pipe joint which are of importance for carrying a large longitudinal load in the joint. These include use of a ductile key for redistribution of load along the length of the joint in the brittle fiber reinforced composite; location of the key along a tapered surface so that there are individual shear layers rather than transferring all of the shear load in a single layer in the brittle material; a round key and key way groove for minimizing stress concentrations in the brittle material; friction actuation of the pipe joint which significantly amplifies the load carrying capability provided by the key; and means for sealing the joint independent of the mechanical load carrying structure.

Fiber reinforced epoxy pipe has very little ductility. If one makes up a bell and spigot joint between pieces of fiberglass pipe bonded with adhesive, shear loading is transferred from the stiff adherent to the ductile adhesive nonuniformly. It has been shown that there is a very high shear loading at the end of the adhesive which decreases significantly with distance. The high shear load can cause progressive failure of the adhesive and failure of the joint. The tapered joint with a ductile key avoids this by redistributing the load along the length of the pipe joint.

The proportion of shear stress at the end of the joint depends on the length of the joint. A long joint shows an end stress much higher than the average stress along the joint length. A short joint has more uniform shear stress. It may be considered that the ductile helical key divides the long joint into a number of short joints, each of which has a smaller stress concentration at the end. Furthermore, plastic shear failure of a part of the key does not propagate to subsequent turns of the key.

One test may demonstrate this: A joint was made with a helical nylon key where the tapered surfaces between the turns of the key were adhesively bonded together. Surprisingly, this joint failed in the fiber reinforced composite at a significantly lower pressure than a comparable joint without the adhesive bonding. Effectively joint just like a lap shear joint without a key.

When an increasing longitudinal load is applied to the pipe joint it affects the first turn of the key a major proportion compared with subsequent turns of the key. When the load exceeds the shear strength of the key in the first turn it deforms in shear and additional load is applied to the next turn of the key. There is progressive deformation of the ductile key along the length of the joint, thereby redistributing the stress along the length of the joint. In effect, one obtains the benefit of a ductile thread for a non-ductile pipe.

In one test a pipe joint was pressurized until incipient failure was detected. The first turns of the key showed plastic deformation in shear with progressively decreasing deformation along the length of the key. Such deformation redistributes stress to achieve reasonably uniform stress on all or most of the length of the key. Thus, the ductile key in the non-ductile fiber reinforced composite redistributes the longitudinal load along the full length of the joint. High stress at the first turn of the key is avoided as the shear area of the successive turns of the key are added for carrying the load. In a lap shear joint, the shear load at the end of a joint may be more than three times the average shear load. A nylon helical key as described herein has a shear load on the first turn only about 30% greater than the average shear load on the key. The fiber reinforced composite is much stiffer than the ductile key. Thus, a portion of the longitudinal load is carried on each turn, or at least most of the turns, of the helical key.

The very high stresses at the loaded end have been minimized in threaded joints by employing what is called a variable pitch thread. Each turn of the thread has a slightly different pitch from the preceding turn so that when a predetermined longitudinal load stretches the threaded member, the threads are uniformly engaged and the stress is distributed along a major portion of the thread instead of being concentrated at the end. Such an arrangement is used, for example, in the breech blocks of cannons.

The ductile "thread" in the fiber reinforced composite pipe joint effects a load redistribution somewhat analogous to a variable pitch thread, without the high cost associated with precision machining of a variable pitch thread. The pitch of the grooves in the pipe joint is uniform along the length of the joint, but the ductile key deforms nonuniformly, thereby redistributing the load along a major portion of the length of the joint. Because of this, essentially all of the shear area of the key (the cross-sectional area of the key at the interface of the conical tapered portions) is bearing load. The pressure carrying capability of the joint can therefore be determined by knowing the strength of the key material and the shear area available.

The functioning of the ductile key in the tapered pipe joint is not completely understood. Visual examination of a ductile key taken from a joint after pressurizing shows no clear evidence of plastic deformation of the key until near the pressurization for failure of the joint. Small marks can be seen, but they intuitively seem too small to account for the observed effects. Apparently what is happening is that the key deforms elastically (i.e. nearly linearly) sufficiently to redistribute the load at pressures up to near the failure of the joint, and plastically deforms thereafter.

The longitudinal strain of a pipe joint can be measured as pressure is applied. It is found that there is a linear increase in joint length with increasing pressure up to a certain limit and above that limit there is non-linear increase. If, however, pressure is released within the linear region, the joint decreases in length only part way to its original length. For example, the "permanent" growth of the joint may be about 20% of the total linear increase. Such permanent growth of the joint indicates ductile behavior of at least some part of the key. Subsequent pressurizations simply move the increased length back and forth within the linear region above this permanent set. This indicates redistribution of the load along the length of the joint during the first pressurization.

The linear region of lengthening of the joint is a function of at least the size of the key. For example, a nylon key having a diameter of about 4.7 mm showed a linear joint growth of about 0.6 mm. A nylon key having twice this diameter showed about twice as much linear growth in the joint. The effect of the material used for forming the key has not been fully established. High purity aluminum has about twice the failure strength of the nylon used for the key. A joint made with six turns of a nylon key is approximately equivalent to the same joint with three turns of an aluminum key. For the same joint performance, an aluminum key shows less joint growth than a nylon key. It is assumed that this is caused by the higher modulus of elasticity of aluminum as compared with nylon.

It may be that the required "ductility" is a combination of softness or low modulus of elasticity relative to the rigid fiber reinforced composite to accommodate appreciable elastic deformation, as well as plastic deformation usually associated with the term "ductile". Thus, as used herein the term "ductile" encompasses soft, flexible materials like nylon, high purity aluminum and their equivalents.

Permanent growth of the joint is also a function of joint length for rather long joints. The proportion of load on the end turns of the key in a long joint is appreciably higher than the load in the middle of the joint. Thus, the ends of the key must deform before there is any appreciable load in the middle of the key. The longer the joint, the greater deflection that is needed for redistributing the load along the full length of the joint.

The diameter of the key and number of turns of the key along the helix are selected to provide ample key shear area to accommodate the rated load on the joint and the growth of the joint during pressurization without significantly reducing the total shear area of the key. In other words the reduction in shear area due to plastic deformation of the key is a small percentage of the total shear area of the key. One can calculate the longitudinal strength of a joint from the shear area of the key.

In addition, the longitudinal strength is enhanced by friction between the tapers due to load transferred across the pipe-coupling interface. This can be a substantial fraction of the total load carrying capability of the joint. In fact, the friction actuation of the joint can contribute as much or more of the load carrying capability as the ductile key. To enhance the friction actuation, the circumferential or hoop stiffness of the outer coupling is made at least as large as the stiffness of the joint moiety on the pipe inserted into the coupling. Preferably the hoop stiffness of the coupling is at least twice as large as the hoop stiffness of the pipe.

The hoop stiffness of the coupling may be made large by making it of a material such as steel which has a much higher modulus of elasticity than glass reinforced epoxy. The modulus of steel is about $20 \times 10^5$ kg/cm$^2$, whereas the modulus of glass fiber reinforced epoxy is about $2.5 \times 10^5$ kg/cm$^2$. Generally, however, it is preferable to avoid steel couplings and employ a coupling that is fiber reinforced composite.

The stiffness of the coupling can be enhanced by increasing the wall thickness. The stiffness is a function of wall thickness and hoop or circumferential modulus of elasticity of the material used to fabricate the coupling. It is preferable, however, to keep the couplings small by using a material with a higher modulus of elasticity than the glass reinforced epoxy typically used in fiber reinforced composite pipe.

A high stiffness coupling can be obtained by winding the coupling with carbon or graphite fibers. Such a composite of carbon fiber in epoxy has a modulus in the order of $7 \times 10^5$. In such an embodiment, a coupling is wound with glass or carbon fibers nearer the internal part of the coupling with customary helix angles for obtaining a desired proportion of longitudinal and circumferential strength. Once sufficient longitudinal strength is obtained, carbon or glass fibers in epoxy resin may be wrapped at a helix angle of 70° to 90° to build up additional hoop stiffness.

Furthermore, the hoop stiffness of the coupling may be increased by winding high tensile strength steel wire instead of carbon fibers. Although the modulus of steel is somewhat below the modulus of the least expensive carbon fibers, the total stiffness of the coupling can be enhanced at lower cost with steel windings. Such windings may include steel strips (analogous to those in the pipe wall) as well as steel "fibers". In such an embodiment the steel is completely embedded within the fiber reinforced resin and therefore protected from corrosion.

Friction actuation of the pipe joint can be visualized by imagining that the coupling is infinitely stiff. In that case, the entire internal pressure in the pipe is carried by the coupling and all of the pressure is transmitted across the tapered pipe-coupling interface. This would provide 100% of the available friction to add to the strength of the key to prevent longitudinal extension of the joint.

On the other hand, assume that the stiffness of the coupling is exactly equal to the stiffness of the pipe. In this embodiment half of the pressure load is carried by the coupling and half is carried by the pipe. Thus, half of the internal pressure is carried through the pipe-coupling interface. The addition to the longitudinal load carrying capability of the pipe joint is thus 50% of the total friction available.

If the coupling stiffness is twice of the pipe, two-thirds of the load is carried by the coupling and one-third by the pipe. Since two-thirds of the pressure load is conveyed through the pipe-coupling interface the addition of friction to the strength of the key is 66% of the total theoretical for an infinitely stiff coupling.

Table 1 indicates calculated values for the properties of an exemplary fiber reinforced pipe joint as described herein. These values were calculated for a nominal eight inch (20 centimeter) pipe for a 200 bar internal pressure rating. The internal moiety (spigot) of the pipe joint is glass fiber reinforced epoxy. The external moiety (coupling) of the pipe joint is carbon fiber reinforced epoxy. The significant parameters of the pipe joint are indicated in English units. In the last column of the table the English units are converted to metric. Not stated directly in the table is the taper, which has a four degree included half angle.

For purposes of calculating the contribution of friction to the longitudinal strength of the joint it is assumed that the tapered surfaces are lubricated, with a resulting coefficient of friction of 0.1. One would not normally lubricate the joint but it is apparent that a nonlubricated joint would be stronger, and hence would have a greater safety margin. The calculations are based on a lubricated joint to account for the situation where a field crew assembling pipes might decide to lubricate the joint to make it easier to assemble, or where unplanned contamination is present in the joint. It can be shown from the calculations that the joint retains an adequate margin of safety even if it is lubricated. Actual tests have verified the accuracy of the predictions based on such calculations.

The contribution of friction to the longitudinal load bearing capability of the pipe joint can be seen by reference to the calculated values in the table. In this embodiment with a coefficient of friction of only 0.1 the proportion of the total longitudinal load carried by friction is 32%. Thus the margin of safety in the pipe joint is increased from 3.85 based on the key only to 5.69 when the contribution of both friction and the shear strength of the key are included.

TABLE 1

INPUT DATA

| | | |
|---|---|---|
| ID = PIPE INSIDE DIAMETER | 8.225 in. | 20.9 cm |
| T1 = MINIMUM SPIGOT THICKNESS IN KEY AREA | 0.914 in. | 2.3 cm |
| T2 = MAXIMUM SPIGOT THICKNESS IN KEY AREA | 2 in. | 5.1 cm |
| L1 = AXIAL LENGTH OF JOINT IN KEY AREA | 15.566 in. | 39.5 cm |
| T3 = MINIMUM SPIGOT THICKNESS AT SEAL | 0.53 in. | 1.35 cm |
| T4 = MAXIMUM SPIGOT THICKNESS AT STEP TO KEY AREA | 0.699 in. | 1.78 cm |
| L2 = AXIAL LENGTH FROM SEAL TO STEP TO KEY AREA | 2.415 in. | 6.13 cm |
| T5 = THICKNESS OF COUPLING OVER T1 | 1.475 in. | 3.75 cm |
| T6 = THICKNESS OF COUPLING OVER T2 | 0.389 in. | 0.99 cm |
| T7 = THICKNESS OF COUPLING OVER T3 | 1.859 in. | 4.72 cm |
| T8 = THICKNESS OF COUPLING OVER T4 | 1.69 in. | 4.29 cm |
| MU = COEFFICIENT OF FRICTION | 0.1 | |
| KD = KEY DIAMETER | 0.3125 in. | 0.79 cm |
| KP = KEY PITCH | 1 in. | 2.5 cm |
| NKT = NUMBER OF KEY THREADS | 13 | |
| KS = KEY SHEAR STRENGTH | 5,500 psi | 386 kg/cm$^2$ |
| JD = MAX JOINT DEFLECTION AT MAX KEY SHEAR STRESS | 0.025 in. | 0.63 mm |
| PR = PIPE PRESSURE RATING REQUIRED | 3,000 psi | 210 bar |
| CMODS = CIRCUMFERENTIAL MODULUS OF SPIGOT | 3,500,000 psi | 2.5 × 10$_5$ kg/cm$^2$ |
| CMODC = CIRCUMFERENTIAL MODULUS OF COUPLING | 10,000,000 psi | 7.0 × 10$_5$ kg/cm$^2$ |

CALCULATED VALUES

| | | |
|---|---|---|
| KEY LENGTH | 454.93 in. | 1.15 m |
| KEY SHEAR AREA | 142.16 in.$^2$ | 920 cm$^2$ |
| KEY MAX SHEAR FORCE | 781,903 lbs. | 35,500 kg |
| MAX PRESSURE AT MAX KEY SHEAR STRESS | 11,548 psi | 812 kg/cm$^2$ |
| SAFETY FACTOR BASED ON KEY ONLY | 3.85 | |
| MAX PRESSURE WITH KEY AND FRICTION | 17,059 psi | 1,200 kg/cm$^2$ |
| SAFETY FACTOR WITH KEY AND FRICTION | 5.69 | |
| PERCENTAGE OF TOTAL LOAD CARRIED BY FRICTION | 32% | |
| PERCENTAGE OF TOTAL LOAD TO KEY ONLY LOAD (AMPLIFICATION) | 148% | |
| JOINT AXIAL DEFLECTION BASED ON KEY ONLY | 0.025 in. | 0.63 mm |
| JOINT RADIAL CLEARANCE BASED ON AXIAL DEFLECTION | 0.00174 in. | 44 μm |
| "APPARENT" KEY SHEAR STRESS | 8,125 psi | 570 kg/cm$^2$ |

In addition to increasing the stiffness of the coupling one may increase the proportion of the longitudinal load carried by friction by increasing the length of the joint. Ordinarily one does not consider that friction increases by increasing the area for a given load. That principle is not applicable, however, in an increasing length of this pipe joint since the total radial load is not constant. In the pipe joint the radial load applied at the friction interface is directly proportional to the area and the pressure within the pipe joint (as well as stiffness). Thus, as a pipe joint is made longer the friction component of the load carrying capability goes up exponentially.

For example, if one doubles the length of the joint and the length of the key in the joint, the friction area (and load) are doubled, as is the shear area of the key. This means that it takes twice the longitudinal load to shear the key and the pressure rating of the pipe joint (based on key shear) can also be doubled. The doubling of the pressure rating, of course, increases the radial load and the contribution of friction. Thus, doubling of the friction area and pressure rating increases the friction component four times.

The seal between the pipe and coupling has a distinct advantage in assembling a pipeline, for example, since the seal can be inspected to assure that there is good sealing. After the pipe joint is assembled with the tapers in engagement, the space between the O-rings is pressurized with gas to determine whether the O-rings have formed a seal. This can be quickly verified. A liquid thermosetting sealant is then pumped into one of the passages, with the opposite passage serving as a bleed hole to verify that the sealed space between the O-rings has been filled. A radiopaque material such as a barium compound is included in the sealant. The seal can then be X-rayed for detecting any bubbles or voids in the sealant. A sealant with a relatively slow curing cycle can be employed so that the inspection can be performed before the sealant is cured and any defective seal can be readily reworked while the sealant is still liquid.

The seal arrangement is also particularly well suited for laying sub-sea pipelines or installing the pipes in other locations under water. A joint may be assembled, sealed and tested on the deck of a ship and then passed overboard before the sealant has cured. The O-rings protect the sealant from the water while the sealant cures.

In the event of underwater repair of a pipeline the joint can be made up and sealed without removing the pipe from the water. Dry air blown through the seal space between the passages ejects water and dries the seal surfaces. Complete drying is not needed since polysulfide adhesive sealant adheres well to damp surfaces.

One may clean the sealing surfaces of such a joint after the joint is assembled. Cleaning solvent can be passed through the space between the O-rings and then removed with dry air. One may also capture a test sample of the sealant that flows from the vent passage to verify that the sealant has cured. The total shear area of the sealant is intentionally kept at near a minimum required to resist internal pressure so that a joint can be disassembled even after the sealant has cured. Application of sufficient torque to the joint shears the sealant when the joint is threaded apart. Sealant can be removed from a disassembled joint so that the joint can be reassembled and resealed.

This combination of mechanically locking thread, two O-ring seals and injected adhesive sealant offers the structural reliability of mechanical locking and the leak tightness of a welded or bonded joint without fear of surface contamination typical in adhesive bonded joints which may have premature joint failure under pressure. This is particularly important for environmentally sensitive materials such as crude oil.

It might be noted that assembly of such pipe joints can be appreciably faster than making up welded joints in a steel pipeline. For example, a pipe joint as provided in practice of this invention may be assembled, sealed and tested in a half hour or so. This may be compared with a couple of hours for a welded joint in ½ inch (12 mm) wall steel pipe and even longer intervals when there is a greater wall thickness which requires building up additional weld metal.

An exemplary seal has a length between the O-rings of about 2.5 cm. The thickness of the sealant between the facing surfaces is about 0.75 mm. The thickness of the space between the O-rings should be sufficient to permit the liquid sealant to be pumped in without too much back pressure. It should also be sufficient that the cured sealant can accommodate the strain of longitudinal deformation of the pipe joint as the joint is pressurized. In effect, a "rectangle" of sealant deforms into a parallelogram and the thickness must be sufficient to accommodate this strain without exceeding the shear strength of the sealant or adhesive bond between the sealant and adherent. The presence of the elastomeric O-rings at each end of the sealant minimize the high stresses at the ends and enhance the ability of the sealant to accommodate shear strain. The relative radial stiffness of the pipe and coupling also contribute to adhesive sealant strength since the radial stress in the adhesive helps prevent peeling failure due to internal pressure.

On the other hand the sealant cannot be too thick or it may be extruded from the seal by the internal pressure of the fluid in the pipe. It turns out that a major portion of the load on the sealant is due to the pressure on the projected area of the end of the sealant. Thus, the sealant should have sufficient length between the O-rings to resist internal pressure in the pipe. For a sealant with a lap shear strength of about 20 kg/cm$^2$ and radial thickness of about 0.75 millimeters, a length of adhesive of only about 15 mm is sufficient to accommodate an internal pressure of 630 bar (9,000 psi). A short seal length is preferred so that the joint can be readily disassembled.

A nominal 25 centimeter glass fiber reinforced pipe having embedded steel strips and a pipe joint as illustrated in FIG. 2 was pressure tested in a steel coupling. The rated pressure of the pipe was 100 bar. In a short term test the center of the pipe burst at an internal pressure of about 330 bar after about one-half hour at pressure. In all of this test, the pipe joint remained intact. The pipe joint is calculated to have a pressure capability of about 468 bar with a lubricated joint. In other words, the minimum safety margin in the pipe joint is 4.5. It is also of significance that the failure of the pipe at a lower pressure than the failure of a joint occurred in a portion of the pipe remote from the pipe joint. This indicates the absence of a significant stress concentration due to the pipe joint.

For field assembly of pipelines it is preferred to assemble a short coupling onto one end of each length of pipe at the manufacturing site. This enables the seal to be tested and the pipe provided in lengths (typically about 12 meters) with what amounts to a male thread at one end and a female thread at the other end. Thus, in field assembly only one joint needs to be made up between adjacent lengths of pipe.

The new pipe joint makes glass fiber reinforced epoxy pipe suitable for oil well casings. Casings are typically assembled with what is known as an EUE 8-round thread. This thread has proved troublesome for fiberglass pipe and fiberglass casings have never been well accepted despite their corrosion resistance. Other types of joints between fiberglass pipes have never proved suitable for well casings. The new joint is, however, quite suitable. It has good longitudinal load carrying capability for hanging casing in a well. The joint can be made up quickly using the standard tools present on drill rigs and the like. In such usage sealing with a sealant between the O-rings may not be required and the O-ring seals alone should be sufficient in most cases. This further expedites the making up of pipe joints, which can be essentially as rapid as making up the joints of conventional well casings.

Although limited embodiments of pipe joint constructed according to principles of this invention have been described and illustrated herein, it will be understood that many modifications and variations may be made by those skilled in the art. For example, in a relatively thin wall pipe having steel strips embedded in the fiber reinforced resin, an added band of glass fiber reinforced resin may be wrapped around the pipe beyond the larger diameter end of the taper. This enlarged area may be engaged by tooling for assembling the joint without hazard of damaging the thin walled portion of the pipe.

It will also be recognized that a ductile key with a plurality of helical turns in such a pipe joint may be employed where the pipe joint does not have the described taper. A ductile key in such an embodiment may have sufficient accommodation for deforming in shear and redistributing the longitudinal load along the length of the pipe. A taper in such a joint is, however, preferred so that the shear load at each turn of the helix is at a different radial distance and the shear layers do not line up. This enhances the shear strength of the pipe joint.

Although the structure of the pipe joint has been described for a pipe and coupling, it will be apparent that a similar structure may be provided on a pipe with an external taper on one end and an internal taper on the other end. Likewise instead of a straight coupling, the internal taper may be for other pipe fittings such as tees, elbows, unions or the like.

The joint is also particularly well suited for a high pressure transition between a fiber reinforced composite pipe and a steel coupling, valve or other fitting. It may be useful, for example, to include a steel coupling in a fiber reinforced composite pipeline where it may be desired to tap into the pipeline. Tapping through the wall of a fiber reinforced composite pipe, particularly one with embedded steel strips, may be impractical.

Steel has a significantly different modulus of elasticity than fiberglass reinforced resin. When such materials are threaded together and undergo elongation under load, the stretching is rather different and the resulting thread pitch is different in the two materials. The ductile key in the joint accommodates the difference in modulus without degrading the strength of the joint. The sealing arrangement for the joint is also advantageous when the pipe and coupling materials are different. The joint also has the adaptability of a threaded joint for use in a variety of settings where a joint may need to be disassembled.

It should therefore be understood that within the scope of the appended claims, this invention may be practiced otherwise than as specifically described.

What is claimed is:

1. A pipe joint comprising:
   a fiber reinforced composite pipe having an external taper on one end with an included half angle in the range of from one to five degrees;
   a groove extending helically along the length of the external taper;
   a coupling having an internal taper having an included half angle the same as the half angle on the external taper;
   a groove extending helically along the length of the internal taper having the same pitch as the groove in the external taper; and
   a ductile key member extending helically a plurality of turns along both grooves for locking the external and internal tapers together.

2. A pipe joint as recited in claim 1 wherein the included half angle is in the range of from two to four degrees.

3. A pipe joint as recited in claim 1 further comprising means for sealing the joint located between an end of the key member and the inside of the pipe joint.

4. A pipe joint as recited in claim 1 further comprising a first surface outside the pipe adjacent at least one end of the key member, a second surface inside the coupling facing the first surface and an elastic sealant between the facing surfaces adhered to both facing surfaces for sealing the joint.

5. A pipe joint as recited in claim 4 further comprising a circumferential elastomeric seal adjacent each longitudinal end of the sealant for retaining sealant between the elastomeric seals.

6. A pipe joint as recited in claim 1 wherein the hoop stiffness of the coupling adjacent to the internal taper is at least as large as the hoop stiffness of the pipe adjacent to the external taper.

7. A pipe joint as recited in claim 1 wherein the hoop stiffness of the coupling adjacent to the internal taper is at least twice as large as the hoop stiffness of the pipe adjacent to the external taper.

8. A pipe joint as recited in claim 1 wherein at least the portion of the pipe adjacent to the external taper is formed with glass fiber reinforcement and at least the portion of the coupling adjacent to the internal taper is formed with fiber reinforcement having a larger modulus of elasticity than glass.

9. A pipe joint as recited in claim 1 wherein the key member has up to about one half the shear strength of the pipe and coupling adjacent to the grooves.

10. A pipe joint as recited in claim 1 wherein the key member has a sufficiently smaller stiffness than the fiber reinforced composite adjacent to the key member for redistributing longitudinal stress along the length of the joint.

11. A pipe joint as recited in claim 1 wherein at least the portion of the pipe adjacent to the external taper is formed with glass fiber reinforcement, at least the portion of the coupling adjacent to the internal taper is formed with glass fiber reinforcement and the key member has up to about one half the shear strength of the pipe and coupling adjacent to the grooves.

12. A pipe joint as recited in claim 1 wherein the key member comprises a relatively lower shear strength sheath and a relatively higher shear strength core.

13. A pipe joint as recited in claim 12 wherein the lower shear strength sheath comprises a ductile plastic and the higher shear strength core comprises steel.

14. A pipe joint as recited in claim 13 wherein the steel core comprises a multistrand cable.

15. A pipe joint as recited in claim 1 wherein the key member comprises a hollow tube.

16. A pipe joint as recited in claim 15 wherein the hollow tube has a shear strength less than the shear strength of the pipe and coupling adjacent to the grooves.

17. A pipe joint as recited in claim 1 wherein the key member is formed of high purity aluminum.

18. A pipe joint as recited in claim 1 wherein the key member is formed of nylon.

19. A pipe joint as recited in claim 1 wherein each of the grooves is half round and the key is round.

20. A pipe joint comprising:
    a fiber reinforced composite pipe having an external pipe joint moiety on one end;
    a groove extending helically along the length of the external pipe joint moiety;
    a coupling having an internal pipe joint moiety having an included half angle the same as an included half angle on the external pipe joint moiety;
    a groove extending helically along the length of the internal pipe joint moiety having the same pitch as the groove in the external pipe joint moiety; and
    a key member extending helically a plurality of turns along both grooves for locking the external and internal pipe joint moieties together, the key member having sufficient ductility for plastically deforming in shear and redistributing longitudinal loads along the length of the pipe joint.

21. A pipe joint as recited in claim 20 wherein the coupling comprises steel having a different modulus of elasticity than the fiber reinforced composite.

22. A pipe joint as recited in claim 20 wherein the key member is selected from the group consisting of a relatively lower shear strength sheath and a relatively higher shear strength core, a ductile plastic sheath and a steel core, a hollow tube, a high purity aluminum rod and a nylon rod.

23. A pipe joint as recited in claim 20 further comprising a first surface outside the pipe between an end of the key member and the inside of the pipe, a second surface inside the coupling facing the first surface, and an elastic sealant between the facing surfaces adhered to both facing surfaces for sealing the joint.

24. A pipe joint as recited in claim 23 further comprising a circumferential elastomeric O-ring adjacent each longitudinal end of the sealant for retaining sealant between the elastomeric seals.

25. A pipe joint as recited in claim 20 wherein each of the grooves is half round and the key is round.

26. A pipe joint comprising:
    a fiber reinforced composite pipe having an external taper on one end;
    a groove extending helically along the length of the external taper;
    a coupling having an internal taper having an included half angle the same as an included half angle on the external taper;
    a groove extending helically along the length of the internal taper having the same pitch as the groove in the external taper;

a ductile key member extending helically along both grooves for locking the external and internal tapers together;

a first surface outside the pipe adjacent at least one end of the key member;

a second surface inside the coupling facing the first surface; and an elastic sealant between the facing surfaces adhered to both facing surfaces for sealing the joint.

27. A pipe joint as recited in claim 26 further comprising a circumferential elastomeric seal adjacent each longitudinal end of the sealant for retaining sealant between the elastomeric seals.

28. A pipe joint as recited in claim 26 further comprising a sealant injection passage through a wall of the coupling between the elastomeric seals for injecting sealant between the elastomeric seals after the pipe joint is assembled.

29. A pipe joint as recited in claim 26 further comprising a bleed passage through a wall of the coupling between the elastomeric seals for releasing air from between the elastomeric seals as sealant is injected.

30. A pipe joint comprising:

a fiber reinforced composite pipe having an external pipe joint moiety on one end;

a coupling having an internal pipe joint moiety matching the external pipe joint moiety;

means for locking the external and internal pipe joint moieties together in a longitudinal direction; and means for sealing the joint spaced apart from the means for locking the joint moieties together comprising:
a first surface outside the pipe,
a second surface inside the coupling facing the first surface,
a pair of spaced apart circumferential elastomeric seals between the first and second surfaces, and
a sealant between the elastomeric seals and adhered to both surfaces, the sealant being sufficiently elastic for accommodating the maximum longitudinal shear strain of the pipe joint.

31. A pipe joint as recited in claim 30 further comprising:

a sealant injection passage through a wall of the coupling between the elastomeric seals for injecting sealant between the elastomeric seals after the pipe joint is assembled; and a bleed passage through a wall of the coupling between the elastomeric seals for releasing air from between the elastomeric seals as sealant is injected.

32. A pipe joint comprising:

a fiber reinforced composite pipe having an external taper on one end;

a groove extending helically along the length of the external taper;

a coupling having an internal taper having an included half angle the same as an internal half angle on the external taper, wherein the hoop stiffness of the coupling adjacent to the internal taper is at least twice as large as the hoop stiffness of the pipe adjacent to the external taper;

a groove extending helically along the length of the internal taper having the same pitch as the groove in the external taper; and a ductile key member extending helically along both grooves for locking the external and internal tapers together.

33. A pipe joint as recited in claim 32 wherein at least the portion of the pipe adjacent to the external taper is formed with glass fiber reinforcement and at least the portion of the coupling adjacent to the internal taper is formed with fiber reinforcement having a larger modulus of elasticity than glass.

34. A pipe joint as recited in claim 32 wherein the coupling comprises steel having a different modulus of elasticity than the fiber reinforced composite.

35. A pipe joint comprising:

a fiber reinforced composite pipe having an external taper on one end;

a half round groove extending helically along the length of the external taper;

a fiber reinforced composite coupling having an internal taper having an included half angle the same as an included half angle on the external taper;

a half round groove extending helically along the length of the internal taper having the same pitch as the groove in the external taper; and a round ductile key member extending helically a plurality of turns along both grooves for locking the external and internal tapers together, the key member having a shear strength of up to about one half the shear strength of the pipe and coupling adjacent to the grooves.

36. A pipe joint as recited in claim 35 wherein the key member comprises a relatively lower shear strength sheath and a relatively higher shear strength core.

37. A pipe joint as recited in claim 36 wherein the lower shear strength sheath comprises a ductile plastic and the higher shear strength core comprises steel.

38. A pipe joint as recited in claim 32 wherein the steel core comprises a multistrand cable.

39. A pipe joint as recited in claim 35 wherein the key member comprises a hollow tube.

40. A pipe joint as recited in claim 33 wherein the hollow tube has a shear strength less than the shear strength of the pipe and coupling adjacent to the grooves.

41. A pipe joint comprising:

a glass fiber reinforced composite pipe having an external taper on one end with an included half angle in the range of from two to four degrees;

a half round groove extending helically a plurality of turns along the length of the external taper;

a fiber reinforced composite coupling having an internal taper having an included half angle the same as the half angle on the external taper, at least a portion of the coupling being formed of a sufficient amount of material having a higher modulus of elasticity than glass to provide a hoop stiffness greater than the hoop stiffness of the pipe adjacent to the external taper;

a half round groove extending helically a plurality of turns along the length of the internal taper having the same pitch as the groove in the external taper;

a round key member extending helically a plurality of turns along both grooves for locking the external and internal pipe joint moieties together, the key member having sufficient ductility for plastically deforming in shear and redistributing longitudinal loads along the length of the pipe joint;

a first sealing surface outside the pipe between the end of the key member and the end of the pipe;

a second sealing surface inside the coupling facing the first sealing surface;

a pair of spaced apart circumferential elastomeric seals between the first and second sealing surfaces;

a sealant between the elastomeric seals and adhered to both surfaces, the sealant being sufficiently elastic for accommodating the maximum longitudinal shear strain of the pipe joint;

a sealant injection passage through a wall of the coupling between the elastomeric seals for injecting sealant between the elastomeric seals after the pipe joint is assembled; and a bleed passage through a wall of the coupling between the elastomeric seals for releasing air from between the elastomeric seals as sealant is injected.

42. A pipe joint as recited in claim 41 wherein the key member is selected from the group consisting of a relatively lower shear strength sheath and a relatively higher shear strength core, a ductile plastic sheath and a steel core, a hollow tube, a high purity aluminum rod and a nylon rod.

* * * * *

UNITED STATES PATENT AND TRADEMARK OFFICE
CERTIFICATE OF CORRECTION

PATENT NO. : 5,520,422
DATED : May 28, 1996
INVENTOR(S) : Ralph Friedrich; Ming Kuo; Kevin Smyth It is certified that error appears in the above-indentified patent and that said Letters Patent is hereby corrected as shown below:

Column 1, line 29, after "diameter" change "piper" to -- pipe --.
Column 7, line 53, change "Effectively joint just" to -- Effectively the joint was just --.
Column 10, line 28, after "twice" insert -- that --.
Column 11, line 39, in the third column of TABLE 1, change "2.5 x $10_5$ kg/cm²" to -- 2.5 x $10^5$ kg/cm² --.
Column 11, line 41, in the third column of TABLE 1, change "7.0 x $10_5$ kg/cm²" to -- 7.0 x $10^5$ kg/cm² --.
Column 18, line 33, change "claim 32" to -- claim 37 --.
Column 18, line 37, change "claim 33" to -- claim 35 --.

Signed and Sealed this

First Day of October, 1996

*Attest:*

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,520,422
DATED : May 28, 1996
INVENTOR(S) : Ralph Friedrich; Ming Kuo; Kevin Smyth It is certified that error appears in the above-identified patent and that said Letters Patent is hereby corrected as shown below:

Column 4, line 66, replace "firmly on the pipe" with -- placed on the external taper --.

Signed and Sealed this

Eighteenth Day of May, 1999

Attest:

Q. TODD DICKINSON

*Attesting Officer*              Acting Commissioner of Patents and Trademarks